United States Patent
Kotani et al.

(10) Patent No.: US 7,630,220 B2
(45) Date of Patent: Dec. 8, 2009

(54) HIGH FREQUENCY POWER SUPPLY

(75) Inventors: Hiroyuki Kotani, Osaka (JP); Michio Taniguchi, Osaka (JP); Tatsuya Ikenari, Osaka (JP); Hirotaka Takei, Osaka (JP)

(73) Assignee: Daihen Corporation, Osaka (JP)

( * ) Notice: Subject to any disclaimer, the term of this patent is extended or adjusted under 35 U.S.C. 154(b) by 133 days.

(21) Appl. No.: 11/793,923

(22) PCT Filed: Dec. 27, 2005

(86) PCT No.: PCT/JP2005/023912

§ 371 (c)(1),
(2), (4) Date: Jun. 22, 2007

(87) PCT Pub. No.: WO2006/070809

PCT Pub. Date: Jul. 6, 2006

(65) Prior Publication Data

US 2008/0048632 A1     Feb. 28, 2008

(30) Foreign Application Priority Data

Dec. 27, 2004   (JP)   ............................. 2004-377437

(51) Int. Cl.
*H02M 3/335*   (2006.01)
*H02M 7/538*   (2006.01)

(52) U.S. Cl. ........................................ 363/25; 363/134

(58) Field of Classification Search .................. 363/24, 363/25, 26, 133, 134
See application file for complete search history.

(56) References Cited

U.S. PATENT DOCUMENTS

| | | | | |
|---|---|---|---|---|
| 3,743,916 A | * | 7/1973 | Weischedel et al. | 363/23 |
| 4,876,638 A | * | 10/1989 | Silva et al. | 363/97 |
| 6,009,001 A | * | 12/1999 | Otake | 363/23 |
| 6,028,413 A | * | 2/2000 | Brockmann | 320/108 |

FOREIGN PATENT DOCUMENTS

| | | |
|---|---|---|
| JP | 56-39723 | 4/1981 |
| JP | 5-343929 | 12/1993 |
| JP | 2001-197749 | 7/2001 |
| JP | 2004-222351 | 8/2004 |
| JP | 2004-240880 | 8/2004 |
| JP | 2004-320418 | 11/2004 |

* cited by examiner

*Primary Examiner*—Shawn Riley
(74) *Attorney, Agent, or Firm*—Hamre, Schumann, Mueller & Larson, P.C.

(57) ABSTRACT

A high frequency power supply includes a DC source unit (19) that outputs a DC voltage Vdc having an output level corresponding to a target voltage, an oscillation unit (13) that outputs a high frequency voltage signal having an output level corresponding to a target power, an amplification unit (14) that includes a plurality of amplifying elements, and amplifies and outputs the high frequency voltage signal output by the oscillation unit (13) utilizing the DC voltage output by the DC source unit (19), an output voltage detection unit (21) that detects an amplitude of the voltage between the amplified-side terminals of the amplifying elements in the amplification unit (14), or an amplitude of a voltage that is proportional to the amplitude of the voltage between the amplified-side terminals, and a target voltage decision unit (22) that decides a target value of the DC source voltage Vdc to be outputted by the DC source unit (19) based on the detection result from the output voltage detection unit (21).

14 Claims, 18 Drawing Sheets

HIGH FREQUENCY POWER SUPPLY

TECHNICAL FIELD

The present invention relates to a high frequency power supply that supplies a high frequency power via an impedance matching device to a load such as a plasma processing apparatus that executes a plasma etching process in a semiconductor wafer process.

BACKGROUND ART

An example of conventional high frequency power supplies is disclosed in Patent document 1. FIG. 18 is a block diagram showing the configuration of the power supply of Patent document 1.

Patent document 1: JP-A-2001-197749.

This high frequency power supply includes an output power setting unit 41 that decides a value of the high frequency power to be supplied to a load, an oscillation unit 43 that changes a level of an oscillation output based on a signal from a control unit 42 to be referred to later, an amplification unit 44 that amplifies the oscillation output by the oscillation unit 43 with a plurality of amplifying elements (not shown), an output power detection unit 45 that detects an output power output by the amplification unit 44, and a control unit 42 that compares the value decided by the output power setting unit 41 and the value detected by the output power detection unit 45, and provides the oscillation unit 43 with error information between those values, thus controlling such that the high frequency power remains constant.

The high frequency power supply also includes a calculation unit 47 that calculates a DC source voltage Vdc to obtain a maximal amplitude within a range where a voltage between terminals on the amplified side of the amplifying element is not saturated, based on a predetermined characteristic graph or a characteristic function with respect to the value decided by the output power setting unit 41, an error amplification unit 50 that amplifies the error between the DC source voltage Vdc calculated by the calculation unit 47 and a DC source voltage Vdc detected by a DC voltage detection unit 52 (referred to later), and outputs the amplified value to a DC source unit 51, the DC source unit 51 that generates the DC source voltage Vdc, and the DC voltage detection unit 52 that detects a magnitude of the DC source voltage Vdc output by the DC source unit 51.

Under such configuration, when the output power setting unit 41 decides the value of the high frequency power, the oscillation unit 43 changes the oscillation output level based on the value of the high frequency power, and the amplification unit 44 amplifies the oscillation output. Meanwhile, the calculation unit 47 calculates the value of the DC source voltage Vdc according to the value of the high frequency power, so that the DC source unit 51 generates the DC source voltage Vdc and supplies the voltage to the amplification unit 44. The amplification unit 44 amplifies the oscillation output based on the DC source voltage Vdc, to supply the amplified oscillation output to the load, for example via an impedance matching device (not shown).

The high frequency power supply may be connected, via the impedance matching device, to a load such as a plasma processing apparatus that processes semiconductor wafers by CVD or etching. In the plasma processing apparatus, the impedance of the load often fluctuates depending on the type and pressure of the gas employed in a plasma chamber, as well as on the value and supply period of the high frequency power to be supplied.

In this case, in the impedance matching device, a variable impedance element (not shown) provided therein changes the reactance (capacitance and inductance), thereby matching the impedance such that the input impedance becomes, for example, 50 Ω.

FIG. 19 is an example of the circuit diagram of the amplification unit 44. The amplification unit 44 is constituted of what is known as a push-pull circuit, and includes a first transformer 53 connected to the oscillation unit 43, a driving voltage supply circuit 54 including a plurality of resistances connected to a secondary winding side of the first transformer 53, a first amplifying element 55 and a second amplifying element 56, for example constituted of a FET (field effect transistor), connected to the driving voltage supply circuit 54, and a second transformer 56 connected to the output terminal of the first and the second amplifying element 55, 56. To the secondary winding of the second transformer 56, the load (not shown) is connected. To the middle point of the primary winding of the second transformer 56, the DC source voltage Vdc generated by the DC source unit 51 is supplied.

FIG. 20 is a waveform chart of the DC source voltage Vdc and a voltage Vp at the output terminal P of the first amplifying element 55 (between the drain and the source of the first amplifying element 55). FIG. 20 indicates that when the amplitude becomes maximal within the range where the voltage Vp at the output terminal P of the first amplifying element 55 is not saturated, the amplification unit 44 incurs a minimal loss. The hatched portions in FIG. 20 represent an extent of the loss, such that the smaller the hatched portion is, the smaller loss is incurred and the higher efficiency is achieved. Here, since FIG. 20 is the waveform chart of the DC source voltage Vdc and the voltage Vp at the output terminal P of the first amplifying element 55, the hatched portions in FIG. 20 does not directly represent the power loss.

In the high frequency power supply, while the load fluctuation is sufficiently mild to allow the impedance matching device to effectively match the impedance, the efficiency is not affected, however when the load fluctuation becomes excessively large or sharp thereby inhibiting the impedance matching, the efficiency is degraded. In the case where a fixed impedance conversion value is employed in the impedance matching device, when the impedance in the load fluctuates downwardly for example, the amplitude of the high frequency voltage supplied to the load is accordingly reduced. In other words, the amplitude of the voltage Vp at the output terminal P of the first amplifying element 55 shown in FIG. 20 is reduced as indicated by dash-dot chain lines, which leads to an increase in loss (area of the hatched portion in FIG. 20), thus leading to degradation in efficiency.

The high frequency power supply shown in FIG. 18 is intended for use under a condition that the load is constant and barely fluctuates, or only fluctuates within such an extent that allows the impedance matching device to effectively execute the impedance matching. The control of the DC source voltage Vdc by this high frequency power supply is, therefore, exclusively executed according to the decided value of the output of the high frequency power to be supplied to the load, without taking into account the degradation in efficiency arising from load fluctuation which disturbs the impedance matching.

DISCLOSURE OF THE INVENTION

The present invention has been proposed under the foregoing situation. An object of the present invention is to provide a high frequency power supply capable of supplying a high frequency power to a load with high efficiency, even when the impedance of the load fluctuates.

The present invention provides a high frequency power supply that supplies a high frequency voltage amplified by an amplification unit to a load. The power supply comprises a DC voltage output unit that is capable of changing an output level of a DC voltage to be outputted; a DC voltage detection unit that detects the DC voltage outputted by the DC voltage output unit; a DC voltage control unit that controls the output level of the DC voltage output unit such that the DC voltage detected by the DC voltage detection unit becomes equal to a target voltage; an oscillation unit that is capable of changing an output level of a high frequency voltage signal to be outputted; an amplification unit including a plurality of amplifying elements to amplify and output the high frequency voltage signal outputted by the oscillation unit utilizing the DC voltage outputted by the DC voltage output unit as an energy source for the amplification; an output power setting unit that decides an output power value of the high frequency power to be supplied to the load; a power detection unit that detects the output of the amplification unit in power value; a high frequency signal control unit that controls the output level of the oscillation unit such that the power value detected by the power detection unit becomes equal to the decided output power value; an amplitude detection unit that detects an amplitude of a voltage between amplified-side terminals of the amplifying elements of the amplification unit, or an amplitude of a voltage that is proportional to the amplitude of the voltage between the amplified-side terminals; and a target voltage decision unit that decides a target value of the DC voltage based on the amplitude of the voltage detected by the amplitude detection unit.

Conventionally, when the load impedance fluctuates, the DC voltage supplied by the DC voltage output unit to the amplification unit remains unchanged, despite the resultant fluctuation in amplitude of the high frequency voltage amplified by the amplification unit. Accordingly, the amplitude does not reach the maximal value within the range where the voltage between the amplified-side terminals of the amplifying elements of the amplification unit (voltage Vp at the output terminal P in FIG. 20) is not saturated, as indicated by a solid line in FIG. 20, but instead the power loss increases because of the fluctuation of the load impedance.

With the configuration according to the present invention, the amplitude of the voltage between the amplified-side terminals of the amplifying elements of the amplification unit, or the amplitude of the voltage proportional to the amplitude of the voltage between the amplified-side terminals is detected, so that the target value of the DC voltage is decided based on the amplitude of the detected voltage. Accordingly, although the load impedance fluctuates, the output level of DC voltage output unit is controlled to be equal to the target voltage, and supplied to the amplification unit. For example, when the amplitude of the high frequency voltage amplified by the amplification unit is reduced because of the fluctuation of the load impedance, the target value of the DC voltage is lowered such that the amplitude becomes maximal within the range where the voltage between the amplified-side terminals of the amplifying elements of the amplification unit is not saturated, and therefore the power loss can be reduced to a maximum possible extent.

Preferably, the amplitude of the voltage detected by the amplitude detection unit is the amplitude of the voltage between the amplified-side terminals of one of the amplifying elements of the amplification unit, or the amplitude of the voltage proportional to the amplitude of the voltage between the amplified-side terminals.

Preferably, the amplitude of the voltage detected by the amplitude detection unit is the amplitude of the voltage between the amplified-side terminals of a plurality of amplifying elements of the amplification unit, or the amplitude of the voltage proportional to the amplitude of the respective voltages between the amplified-side terminals.

More preferably, the target voltage decision unit decides the target value of the DC voltage based on the amplitude of a highest voltage among the amplitudes of the voltages detected by the amplitude detection unit.

Preferably, the high frequency power supply further comprises a DC voltage decision unit that decides the DC voltage based on the output power value decided by the output power setting unit, and a switch unit that temporarily utilizes the output of the DC voltage decision unit as the target voltage, under a specific state.

More preferably, the specific state arises when the amplification unit has started the outputting, or when the output power setting unit has updated the decided output power value.

More preferably, the specific state also arises when the power value detected by the power detection unit has reached a predetermined ratio with respect to the decided output power value.

Preferably, the switch unit utilizes the output of the DC voltage decision unit as the target voltage until a predetermined time elapses after the specific state comes up.

Preferably, the target voltage decision unit decides the DC voltage target value with a lower limit.

Preferably, the amplitude of the voltage detected by the amplitude detection unit is a peak-to-peak value of the voltage.

Preferably, the amplitude of the voltage detected by the amplitude detection unit is an average of the voltages.

Preferably, the amplitude of the voltage detected by the amplitude detection unit is a root mean square value of the voltage.

Preferably, each amplifying element of the amplification unit is constituted of a field effect transistor, and the amplitude of the voltage between the amplified-side terminals is the voltage between a drain and a source of the field effect transistor.

Preferably, each amplifying element of the amplification unit is constituted of a bipolar transistor, and the amplitude of the voltage between the amplified-side terminals is the voltage between a collector and an emitter of the bipolar transistor.

BEST MODE FOR CARRYING OUT THE INVENTION

Embodiments of the present invention will be described below with reference to the accompanying drawings.

Figure 1:
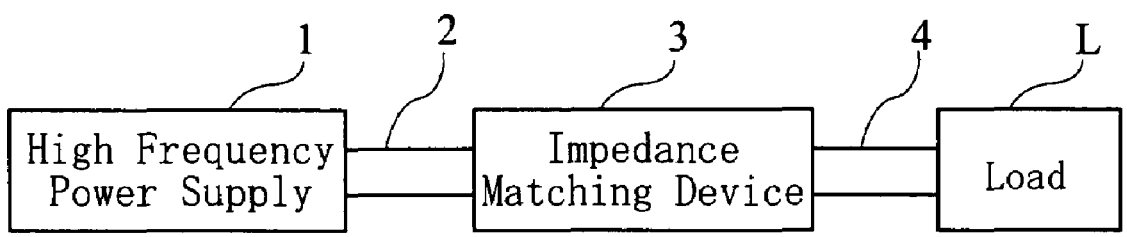
FIG. 1 is a block diagram showing an example of a high frequency power supply system to which a high frequency power supply according to the present invention is applied.

FIG. 1 is a block diagram showing an example of a high frequency power supply system to which a high frequency power supply according to the present invention is applied. The high frequency power supply system serves to supply a high frequency power to a work such as a semiconductor wafer or a liquid crystal substrate, to perform a processing such as a plasma etching. The high frequency power supply system includes a high frequency power supply 1, a transmission line 2, an impedance matching device 3, a load connection interface 4 and a load L.

To the high frequency power supply 1, the impedance matching device 3 is connected via the transmission line 2, constituted for example of a coaxial cable. To the impedance matching device 3, the load L (for example, a plasma processing apparatus) is provided via the load connection interface 4, for example constituted of a copper plate shielded to inhibit electromagnetic wave from leaking. Here, the impedance matching device 3 may be included in the high frequency power supply 1.

The high frequency power supply 1 serves to supply a high frequency power in a frequency range of, for example, 300 kHz to 500 MHz, to the load L. Further description on the high frequency power supply 1 will be given later.

The impedance matching device 3 serves to match the impedance between the high frequency power supply 1 and the load L. To be more detailed, when the impedance of the high frequency power supply 1 seen from the output terminal of the high frequency power supply 1 (output impedance) is rated for example at 50 Ω, and the high frequency power supply 1 is connected to the input terminal of the impedance matching device 3 via the transmission line 2 having a characteristic impedance of 50 Ω, the impedance matching device 3 converts the impedance of the load L seen from the input terminal of the impedance matching device 3 to 50 Ω.

The load L is a plasma processing apparatus employed for processing a work such as a semiconductor wafer or a liquid crystal substrate by an etching or a CVD process. The plasma processing apparatus executes various types of processes for the work according to the purpose. When the work is to undergo an etching process for example, a type and pressure of gas, a value of the high frequency power to be supplied, and a supplying time of the high frequency power suitable for the etching process are appropriately determined, for executing the processing. The plasma processing apparatus introduces plasma discharge gas into a container (not shown) in which the work is placed, to cause the plasma discharge gas to discharge thus converting the gas into a plasma state from a non-plasma state. Then the gas in the plasma state is utilized for processing the work.

Figure 2:
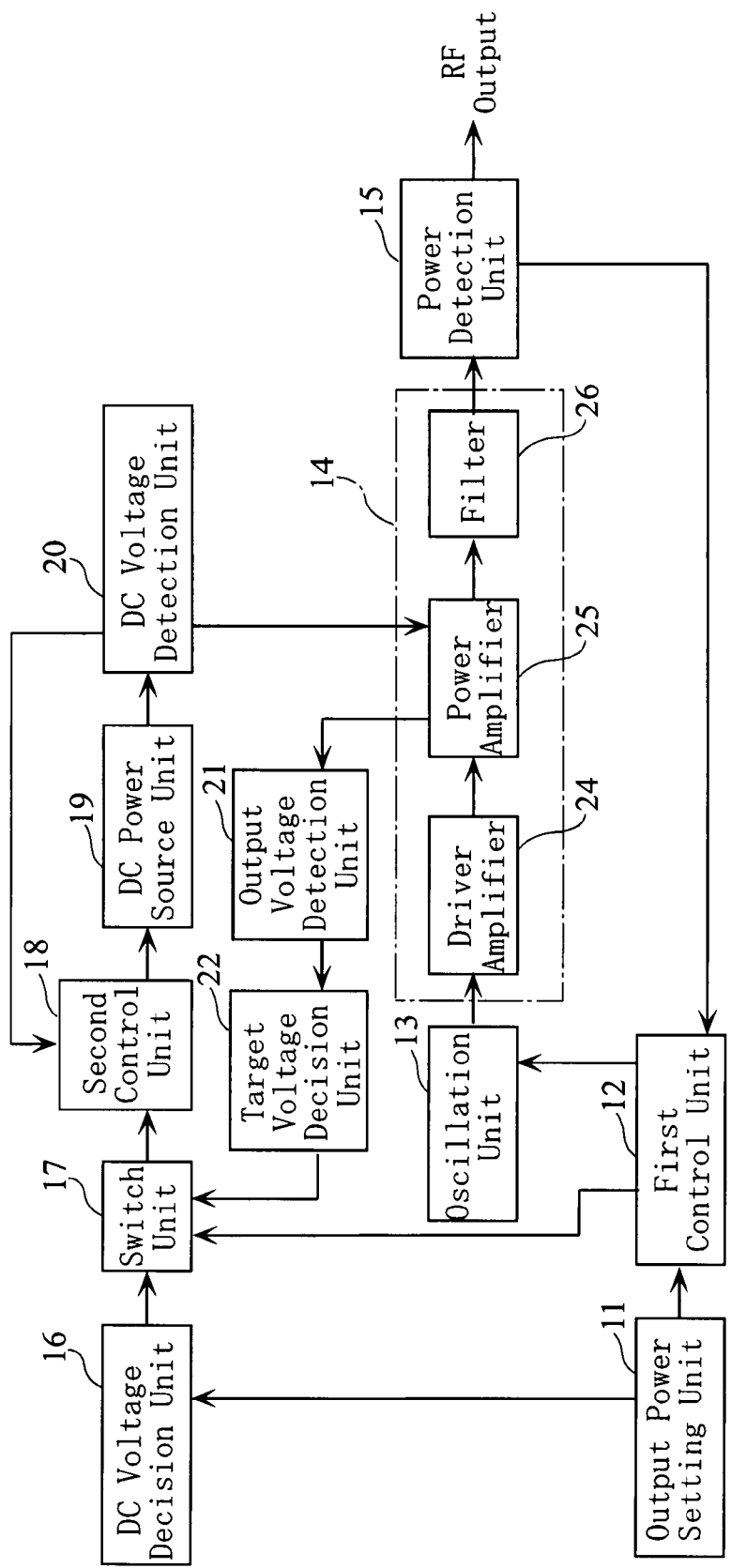
FIG. 2 is a block diagram showing the configuration of a high frequency power supply according to a first embodiment of the present invention.

FIG. 2 is a block diagram showing the configuration of the high frequency power supply 1. The high frequency power supply 1 includes, as shown in FIG. 2, an output power setting unit 11, a first control unit 12, an oscillation unit 13, an amplification unit 14, a power detection unit 15, a DC voltage decision unit 16, a switch unit 17, a second control unit 18, a DC source unit 19, a DC voltage detection unit 20, an output voltage detection unit 21, and a target voltage decision unit 22.

It is to be noted that the output power setting unit 11 is an example of the output power setting unit of the present invention; the first control unit 12 is an example of the high frequency signal control unit of the present invention; the oscillation unit 13 is an example of the oscillation unit of the present invention; the amplification unit 14 is an example of the amplification unit of the present invention; the power detection unit 15 is an example of the power detection unit of the present invention; the DC voltage decision unit 16 is an example of the DC voltage decision unit of the present invention; the second control unit 18 is an example of the DC voltage control unit of the present invention; the DC source unit 19 is an example of the DC voltage output unit of the present invention; the DC voltage detection unit 20 is an example of the DC voltage detection unit of the present invention; the output voltage detection unit 21 is an example of the amplitude detection unit of the present invention; and the target voltage decision unit 22 is an example of the target voltage decision unit of the present invention. In addition, the first control unit 12 collaborates with the switch unit 17, to act as an example of the switch unit of the present invention.

The output power setting unit 11 serves to decide an output value of the high frequency power to be supplied to the load L. Although not shown in FIG. 2, the output power setting unit 11 also includes a control unit having an output power setting switch for setting the output value of the high frequency power and an output start switch that issues an instruction to start supplying the high frequency power and so on. The output value data of the high frequency power decided by the output power setting unit 11 (decided output power value) is output to the first control unit 12 and the DC voltage decision unit 16.

The first control unit 12 serves to compare the output value of the high frequency power decided by the output power setting unit 11 and a detected value of the high frequency power detected by the power detection unit 15, to control the oscillation output level of the oscillation unit 13 such that the compared values become equal. In other words, the first control unit 12 controls the output level of the oscillation unit 13, thereby adjusting to maintain the high frequency power output at a constant level.

The first control unit 12 also outputs a switching signal to the switch unit 17, to utilize the output of the DC voltage decision unit 16 as the target voltage, under a specific state. When a predetermined time elapses after the specific state comes up, the first control unit 12 again outputs the switching signal to the switch unit 17, to utilize the output of the target voltage decision unit 22 as the target voltage. Further description on the DC voltage decision unit 16, the switch unit 17, and the target voltage decision unit 22 will be given later.

The specific state includes the case where the amplification unit 14 has started the outputting, or the output power setting unit 11 has updated the decided output power value. The specific state also includes the case where the power value detected by the power detection unit 15 has reached a predetermined ratio with respect to the decided output power value.

The oscillation unit 13 serves to output a high frequency voltage signal by oscillation, and the level of the high frequency voltage signal is controlled by a control signal from the first control unit 12.

The amplification unit 14 includes a plurality of amplifying elements, and serves to amplify and output the high frequency voltage signal output by the oscillation unit 13, utilizing a DC voltage output by the DC source unit 19, to be referred to later, as an energy source for the amplification. The output voltage amplified by the amplification unit 14 is output to the impedance matching device 3 as the high frequency power, via the power detection unit 15. Details of the amplification unit 14 will be described later.

The power detection unit 15 serves to detect the output of the amplification unit 14 in power value, and is constituted of a directional coupler, for example. The power detection unit 15 splits a high frequency wave proceeding from the amplification unit 14 toward the load L (hereinafter, traveling wave) and a high frequency wave reflected from the load L (hereinafter, reflected wave), thereby detecting the respective values.

The value of the traveling wave detected by the power detection unit 15 is returned to the first control unit 12. The first control unit 12 compares, as already described, the value with the high frequency power value decided by the output power setting unit 11, and outputs the control signal to the oscillation unit 13 such that those values becomes equal. Thus, the first control unit 12, the oscillation unit 13, the amplification unit 14, and the power detection unit 15 constitute a feedback loop, to maintain the output at a constant value.

Figure 20:
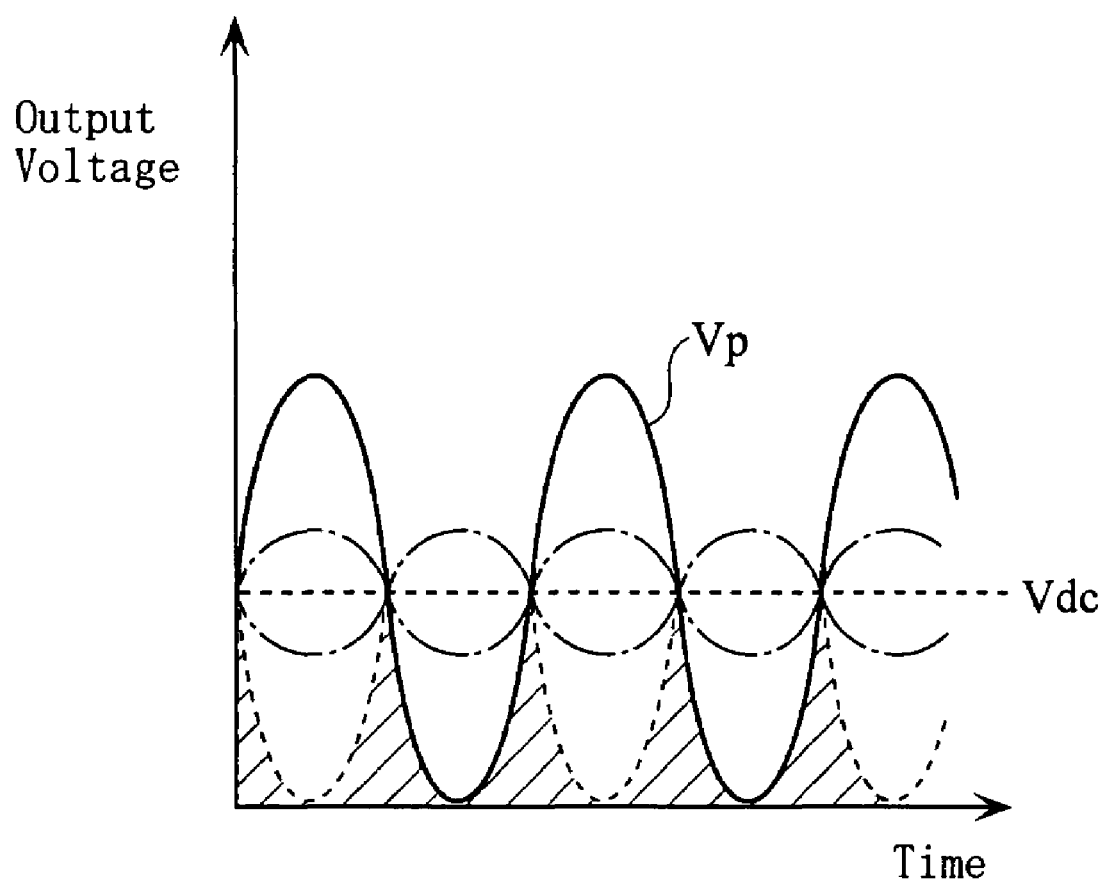
FIG. 20 is a waveform chart of a DC source voltage and a voltage at the output terminal of the amplifying element.

The DC voltage decision unit 16 serves to decide the magnitude of a DC source voltage Vdc to be supplied to the amplification unit 14, based on the decided value of the high frequency power output by the output power setting unit 11, and the decided value of the DC source voltage Vdc is output to the switch unit 17. Here, the decided value of the DC source voltage Vdc is decided, as shown in FIG. 20, such that the amplitude becomes maximal within a range where the voltage between the amplified-side terminals of the amplifying elements in the amplification unit 14 is not saturated, in other words such that an optimal efficiency is achieved within a range where waveform distortion is not incurred.

The switch unit 17 serves to switch between the decided value of the DC source voltage Vdc decided by the DC voltage decision unit 16 and the decided value of the DC source voltage Vdc decided by the target voltage decision unit 22 based on the switching signal from the first control unit 12, and to output either value to the second control unit 18.

The second control unit 18 compares the decided value of the DC source voltage Vdc decided by the DC voltage decision unit 16, or the decided value of the DC source voltage Vdc decided by the target voltage decision unit 22, with the value of the DC source voltage Vdc detected by the DC voltage detection unit 20, to control the DC source voltage Vdc generated by DC source unit 19 to be constant. Such configuration allows the DC source unit 19 to control the DC source voltage Vdc to be constant, and to supply the stabilized DC source voltage Vdc to the amplification unit 14. Thus, the second control unit 18, the DC source unit 19, and the DC voltage detection unit 20 constitute a feedback loop, to maintain the output at a constant value.

The DC source unit 19 serves to generate the DC source voltage Vdc based on the decided value of the DC source voltage Vdc provided by the second control unit 18. The generated DC source voltage Vdc is output to the amplification unit 14 via the DC voltage detection unit 20.

The DC voltage detection unit 20 serves to detect the magnitude of the DC source voltage Vdc generated by the DC source unit 19, the detection result obtained by the DC voltage detection unit 20 is fed back to the second control unit 18.

The output voltage detection unit 21 serves to detect an amplitude of the voltage between the amplified-side terminals of the amplifying elements in the amplification unit 14, or an amplitude of a voltage that is proportional to the amplitude of the voltage between the amplified-side terminals, and the detection result is output to the target voltage decision unit 22. Here, the voltage amplitude detected by the output voltage detection unit 21 is, for example, a peak-to-peak value of the voltage, an average value of the voltages, or a root mean square value of the voltage.

The target voltage decision unit 22 serves to newly decide a value of the DC source voltage Vdc to be generated by the DC source unit 19, based on the detection result from the output voltage detection unit 21. The value of the DC source voltage Vdc decided by the target voltage decision unit 22 is output to the switch unit. 17.

The switch unit 17 receives, as already described, an input of the decided value of the DC source voltage Vdc from the DC voltage decision unit 16 and the decided value of the DC source voltage Vdc from the target voltage decision unit 22, and switches the decided value to be outputted to the second control unit 18 based on the switching signal from the first control unit 12. In other words, the switch unit 17 switches the target voltage to be outputted to the second control unit 18.

When the switch unit 17 is switched, for example, to the target voltage decision unit 22 based on the switching signal, the switch unit 17 outputs the decided value of the DC source voltage Vdc from the target voltage decision unit 22 to the second control unit 18. The DC source unit 19 generates the DC source voltage Vdc, based on the decided value of the DC source voltage Vdc output by the switch unit 17.

It should be noted that in the high frequency power supply 1, when the output power setting unit 11 instructs to start supplying the high frequency power, so that the amplification unit 14 starts outputting the high frequency voltage, the switch unit 17 receives the input of the decided value of the DC source voltage Vdc from the DC voltage decision unit 16, and outputs that value to the second control unit 18. At the time that the amplification unit 14 has started outputting the high frequency voltage, the output voltage detection unit 21 has not yet detected the high frequency voltage to be outputted by the amplification unit 14, and hence the value of the DC source voltage Vdc is not yet decided in the target voltage decision unit 22. In this case, accordingly, the value of the DC source voltage Vdc decided by the DC voltage decision unit 16 is employed. The decided value of the DC source voltage Vdc thus employed may be a predetermined fixed value.

Also, when the decided value of the high frequency power is updated through operation by a control unit (not shown) of the output power setting unit 11, so that the amplification unit 14 outputs the high frequency voltage based on the updated decided value of the high frequency power, the switch unit 17 receives the input of the decided value of the DC source voltage Vdc from the DC voltage decision unit 16, to output that value to the second control unit 18. When the decided value of the high frequency power is updated such that, for example, the high frequency power value is increased, the voltage between the amplified-side terminals of the amplifying elements in the amplification unit 14 may be saturated. In this case, accordingly, the value of the DC source voltage Vdc decided by the DC voltage decision unit 16 based on the decided output power value provided by the output power setting unit 11 is employed. The decided value of the DC source voltage Vdc thus employed may be a predetermined fixed value.

The first control unit 12 turns the switch unit 17 to the side of the DC voltage decision unit 16, when the amplification unit 14 has started outputting the high frequency voltage, or when the output power setting unit 11 has updated the decided output power value, after which, when a predetermined time elapses (for example one second after the switching), switch unit 17 is turned to the side of the target voltage decision unit 22.

Also, when the first control unit 12 decides that a power value detected by the power detection unit 15 has reached a predetermined ratio with respect to the decided output power value (for example, when the detected power value is recognized to have reached approximately 70% of the decided output power value), the first control unit 12 outputs the switching signal to the switch unit 17, to switch the DC source voltage Vdc value decided by the target voltage decision unit 22 to the DC source voltage Vdc value decided by the DC voltage decision unit 16.

The reason of the foregoing arrangement is as follows. When the amplitude of the high frequency voltage output by the amplification unit 14 is reduced in response to load impedance fluctuation, DC source voltage Vdc is also reduced. When the load impedance thereafter returns toward the original state, the output level of the high frequency voltage signal from the oscillation unit 13 is about to be increased, in order to increase the amplitude of the high frequency voltage output from the amplification unit 14. However, the DC source voltage Vdc has not yet been updated, and therefore increasing the level of the high frequency voltage signal output from the oscillation unit 13 results in saturation of the voltage between the amplified-side terminals of the amplifying elements in the amplification unit 14. Therefore, the amplitude of the voltage detected by the output voltage detection unit 21 barely changes (varies depending on the detection method), and hence the value of the DC source voltage Vdc decided by the target voltage decision unit 22 barely changes. In other words, it is difficult to properly control, in case of the load impedance fluctuation in a direction that increases the decided value of the DC source voltage Vdc. In such case, therefore, the value of the DC source voltage Vdc decided by the target voltage decision unit 22 is switched to the value of the DC source voltage Vdc decided by the DC voltage decision unit 16 when the power value detected by the power detection unit 15 has reached a predetermined ratio with respect to the decided output power value, to prevent the value of the DC source voltage Vdc from being excessively reduced.

The amplification unit 14 includes, as shown in FIG. 2, a driver amplifier 24, a power amplifier 25, and a filter 26. The driver amplifier 24 amplifies the output from the oscillation unit 13, and outputs the amplified oscillation to the power amplifier 25. The power amplifier 25 is constituted, for example, of a push-pull circuit shown in FIG. 4, and receives an input of the DC source voltage Vdc from the DC source unit 19 via the DC voltage detection unit 20, to amplify a signal input from the driver amplifier 24 such that the amplitude becomes maximal within the range where the voltage between the amplified-side terminals of once of the amplifying elements in the amplification unit is not saturated, and to output such signal to the filter 26. The push-pull circuit shown in FIG. 4 will be described later. The filter 26 serves to remove waveform distortion of the signal amplified by the power amplifier 25, and to output the signal to the power detection unit 15.

Figure 3:
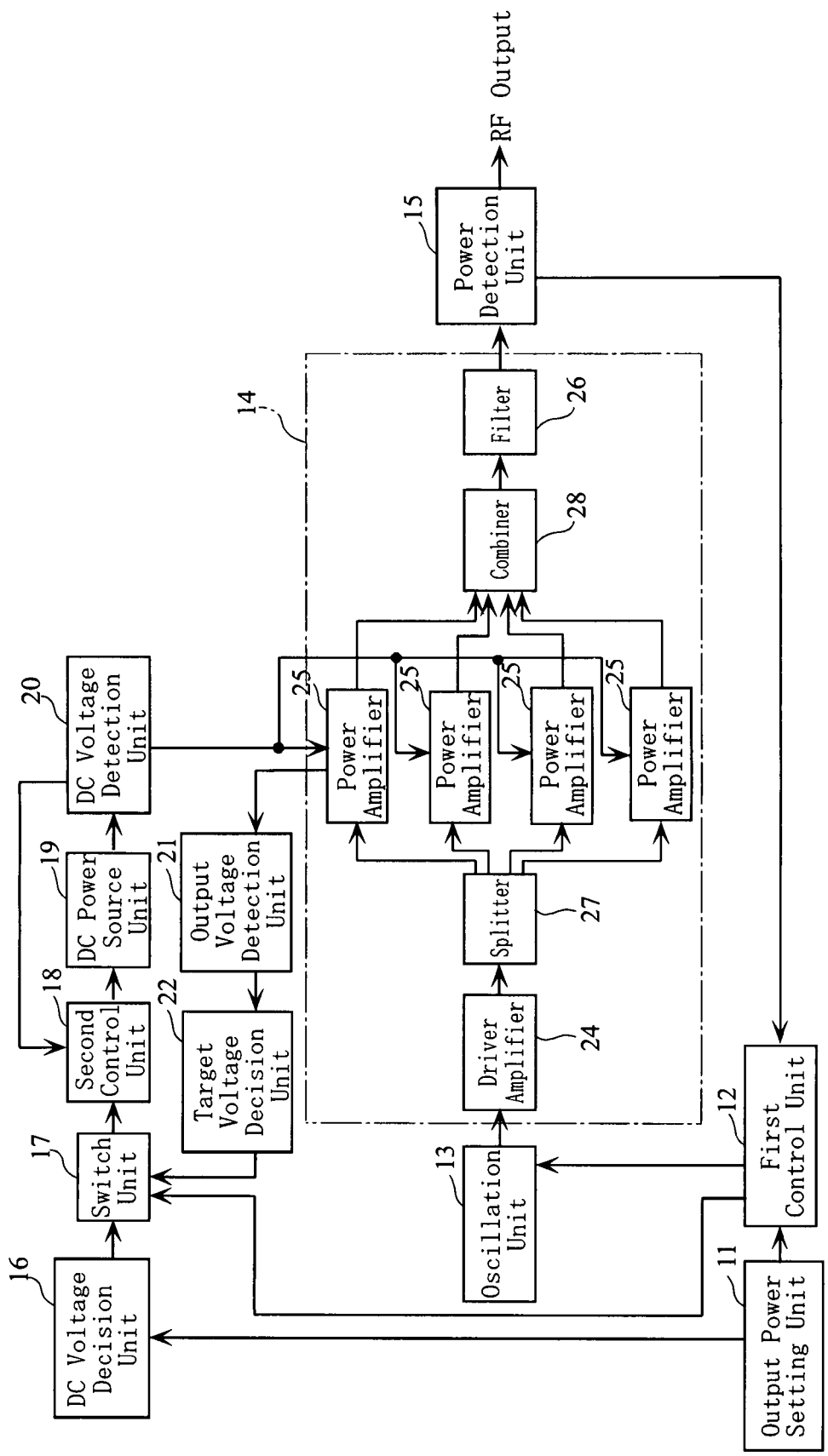
FIG. 3 is a diagram showing the configuration of another high frequency power supply.

Here, the configuration of the amplification unit 14 is not limited to that shown in FIG. 2, but may include, for example, a plurality of power amplifiers 25 as shown in FIG. 3. Specifically, the amplification unit 14 includes four power amplifiers 25, with a splitter 27 provided at an anterior stage thereof and a combiner 28 provided at a posterior stage thereof.

The splitter 27 splits the output of the driver amplifier 24 into four outputs. The combiner 28 merges the outputs of the four power amplifiers 25. The power amplifiers 25 are of a same structure, and respectively receive the DC source voltage Vdc from the DC source unit 19 via the DC voltage detection unit 20. However, since the power amplifiers 25 are of the same structure, the output voltage detection unit 21 may be set to detect the voltage from any one of the power amplifiers 25.

Naturally, the output voltage detection unit 21 may detect the voltage from a plurality of power amplifiers, 25. In this case, the target voltage decision unit 22 may decide the value of the DC source voltage Vdc that specifies a target of the DC voltage (i.e. target voltage) based on the largest amplitude of the voltage among the voltage amplitudes detected by the output voltage detection unit 21.

The number of the power amplifiers 25 is not limited to four as above. The number of the power amplifiers 25 may be determined based on the relationship between a maximum output of the high frequency power required from the high frequency power supply 1 and a maximum value of the high frequency power that the power amplifiers 25 can output.

Figure 4:
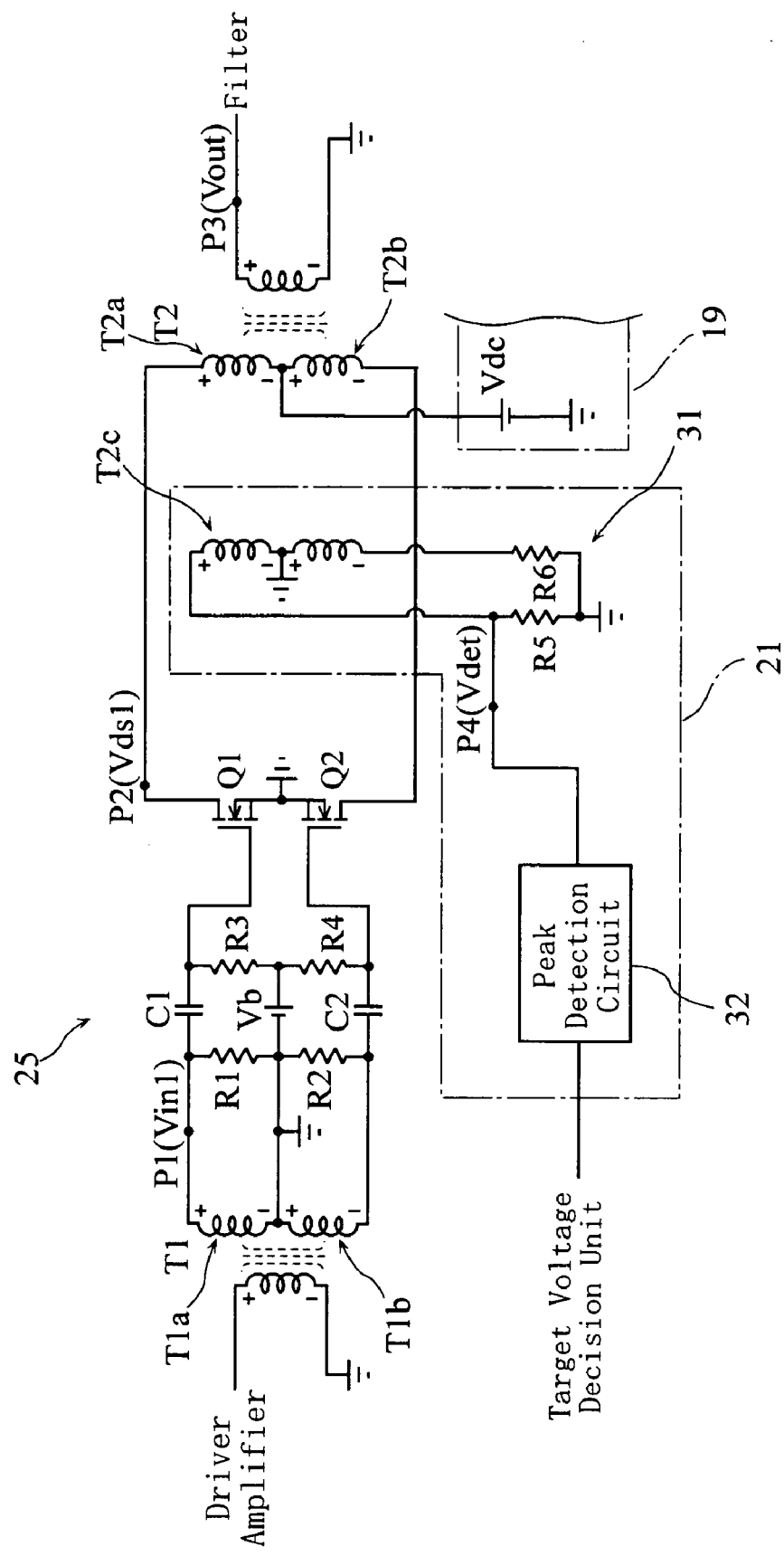
FIG. 4 is a circuit diagram of a power amplifier, an output voltage detection unit and a part of a DC source unit.

FIG. 4 is a circuit diagram of the power amplifier 25, the output voltage detection unit 21 and a part of the DC source unit 19. The power amplifier 25 is constituted in a form of what is known as a push-pull circuit, and includes a first transformer T1 in which a secondary winding is divided into a first winding T1a and a second winding T1b wound in opposite directions, a first amplifying element Q1 and a second amplifying element Q2 constituted, for example, of a FET (field effect transistor), a second transformer T2 in which a primary winding is divided into a first winding T2a and a second winding T2b wound in opposite directions, and a driving voltage supply circuit including resistances R1 to R4, capacitors C1, C2, and a DC voltage source Vb. Here, the first amplifying element Q1 and the second amplifying element Q2 may be constituted of a bipolar transistor or the like, instead of the FET.

The output voltage detection unit 21 includes an auxiliary winding T2c wound on the primary winding side of the second transformer T2, an acquisition circuit 31 that acquires a voltage induced by the resistances R5, R6 on the primary winding side of the second transformer T2, and a peak detection circuit 32. The auxiliary winding T2c has a turns ratio of 1:10 for example, with respect to the primary winding of the second transformer T2.

Since the push-pull circuit is a known art, detailed description thereof will not be herein given, but an operation of the power amplifier 25 and the output voltage detection unit 21 will be described referring to waveform charts of a voltage at points P1 to P4 in the power amplifier 25 and the output voltage detection unit 21 shown in FIGS. 5(a) to 5(c) and 6. Here, the waveform charts shown in FIGS. 5(a) to 5(c) and 6 represent the case where, for example, the DC source voltage Vdc is 100 V, the load impedance is 50 Ω, and the high frequency power is 300 W.

Figure 5:
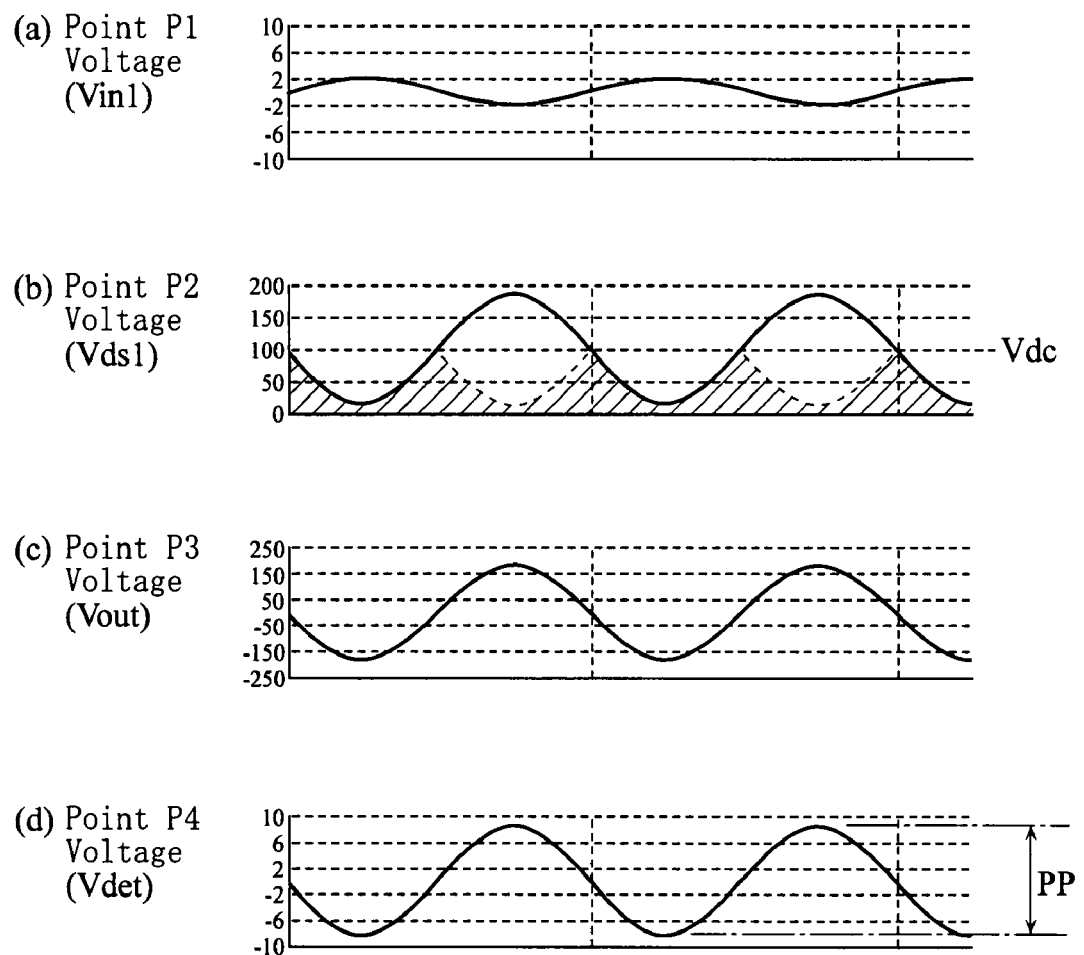
FIGS. 5(*a*) to 5(*d*) are waveform charts of a voltage at each point in the power amplifier and the output voltage detection unit.

When an AC voltage is input to the primary winding side of the first transformer T1 from the driver amplifier 24, currents of mutually reverse phases run through the first winding T1a and the second winding T1b, on the secondary winding side of the first transformer T1 (FIG. 5(a) shows the waveform of the voltage Vin1 at the point P1). By these currents, the first amplifying element Q1 and the second amplifying element Q2 are alternately turned on and off at every half cycle, and such on/off action is repeated.

Between the first winding T2a and the second winding T2b of the primary winding of the second transformer T2, the DC source voltage Vdc generated by the DC source unit 19 is supplied, and hence the voltage between the amplified-side terminals (voltage between the drain and the source) of the first amplifying element Q1 and the second amplifying element Q2 has a value offset by an amount corresponding to the DC source voltage Vdc. In other words, the voltage between the amplified-side terminals of the first amplifying element Q1 presents a waveform based on the DC source voltage Vdc, because the current running through the first winding T2a on the primary winding side fluctuates according to the action of the first amplifying element Q1 and the second amplifying element Q2. Accordingly, the waveform of the voltage Vds1 at the point P2 appears as shown in FIG. 5(b).

Also, since the action of the second amplifying element Q2 is shifted by half a cycle (180 degrees) from that of the first amplifying element Q1, the voltage between the amplified-side terminals of the second amplifying element Q2 presents a waveform shifted by half a cycle (180 degrees) from the voltage between the amplified-side terminals of the first amplifying element Q1 (voltage Vds1). Accordingly, the voltage applied to the ends of the primary winding of the second transformer T2 represents a difference between the voltage between the amplified-side terminals of the first amplifying element Q1 and the voltage between the amplified-side terminals of the second amplifying element Q2. The voltage applied to the ends of the primary winding of the second transformer T2 has, therefore, the amplitude proportional to the amplitude of the voltage between the amplified-side terminals of the first amplifying element Q1.

As described above, the voltage applied to the ends of the primary winding of the second transformer T2 has the amplitude proportional to the amplitude of the voltage between the amplified-side terminals of the first amplifying element Q1, the voltage applied to the ends of the secondary winding of the second transformer T2 has the amplitude proportional to the amplitude of the voltage between the amplified-side terminals of the first amplifying element Q1. (FIG. 5(c) shows the waveform of the voltage Vout at the point P3). After that, the high frequency power is output to the impedance matching device 3 via the power detection unit 15.

The voltage applied to the ends of the auxiliary winding T2c also gains an amplitude proportional to the amplitude of the voltage between the amplified-side terminals of the first amplifying element Q1, and is hence acquired as a voltage having the amplitude proportional to the amplitude of the voltage Vds1, by the voltage acquisition circuit 31 (FIG. 5(d) shows the waveform of the voltage Vdet at the point P4). The voltage Vdet acquired by the voltage acquisition circuit 31 has its peak-to-peak value (indicated by PP in FIG. 5(d)) detected by the peak detection circuit 32, and the peak-to-peak value is output to the target voltage decision unit 22.

Figure 6:
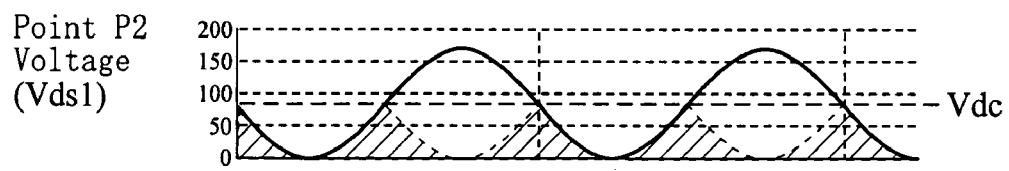
FIG. 6 is a waveform chart of a voltage on point P2 in the power amplifier.

Meanwhile, referring to the voltage Vds1 at the point P2 shown in FIG. 5(b), since the DC source voltage Vdc is set at 100 V, the amplitude is not at its peak within the range where the waveform of the voltage Vds1 at the point P2 is not saturated, but some loss is incurred (as indicated by a hatched portion). This indicates that the high frequency power supply 1 is not operating with its maximal efficiency. In such a case, it is preferable to lower the DC source voltage Vdc as shown in FIG. 6, to reduce the loss to a maximum possible extent (in FIG. 6, the DC source voltage Vdc is set at approximately 83.8 V).

Figure 7:
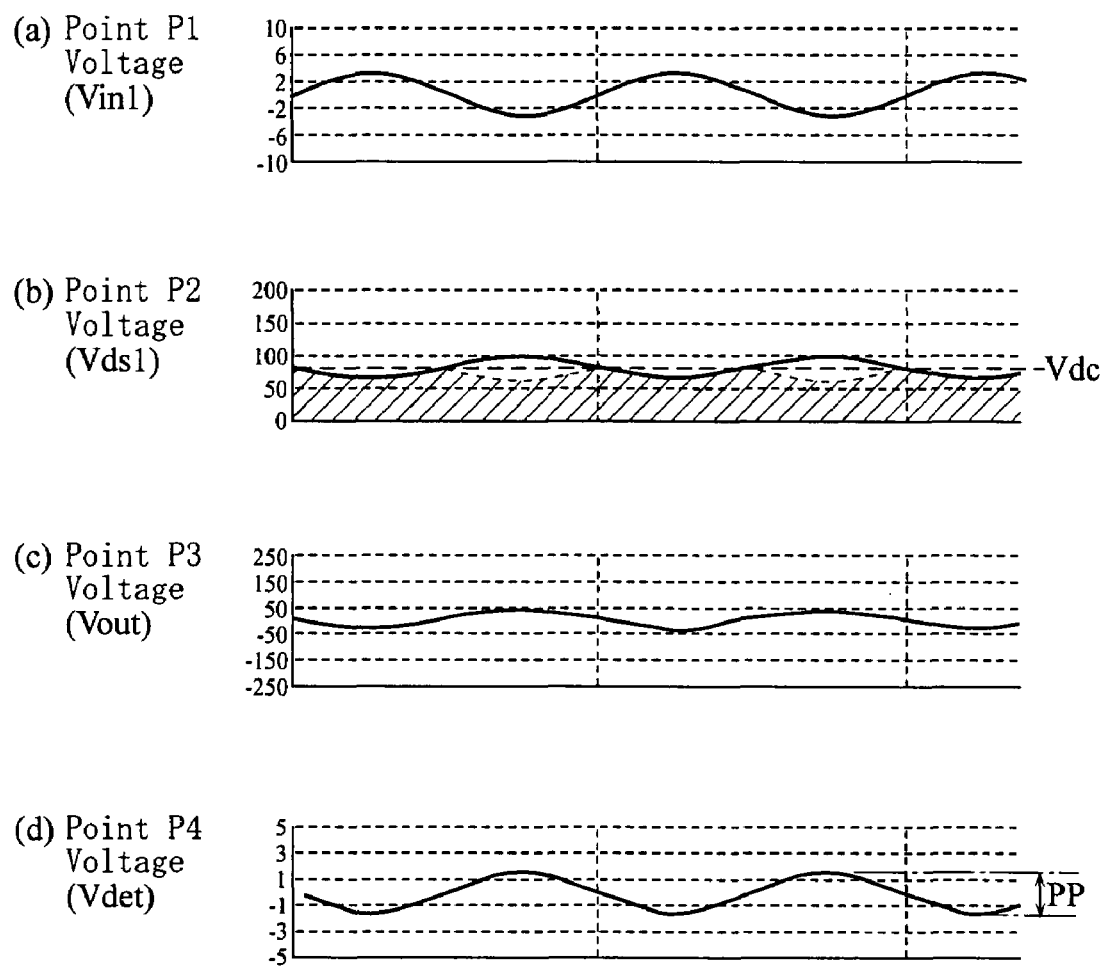
FIG. 7(a) to 7(d) are waveform charts of a voltage at each point in the power amplifier and the output voltage detection unit, obtained under fluctuation of the load impedance.

It will be now assumed that load L has incurred fluctuation in impedance. FIG. 7 is a waveform chart of the voltages at the points P1 to P4 in the power amplifier 25 and the output voltage detection unit 21, presented when the load impedance is reduced to, for example, 5 Ω from 50 Ω.

When the impedance of the load L fluctuates downwardly for example, the high frequency voltage Vout output by the amplification unit 14 is lowered (as shown in FIG. 7(c)), and the amplitude of the voltage between the amplified-side terminals of the first and the second amplifying element Q1, Q2 of the power amplifier 25 is also reduced (as shown in FIG. 7(b)). Accordingly, the amplitude of the voltage Vdet detected by the output voltage detection unit 21 is also reduced (as shown in FIG. 7(d)).

In this case, since the DC source voltage Vdc supplied by the DC source unit 19 to the power amplifier 25 is constant, the loss in the first and the second amplifying element Q1, Q2 (hatched portion in FIG. 7(b)) is increased as shown in FIG. 7(b), which leads to degradation in efficiency of the power amplifier 25 itself.

In the first embodiment described above, when the impedance of the load L fluctuates, the DC source voltage Vdc is newly decided based on the amplitude of the voltage between the amplified-side terminals of the amplifying elements of the amplification unit 14, which follows the fluctuation, or on the amplitude of the voltage proportional to the amplitude of the voltage between the amplified-side terminals. Then the output level of the DC source unit 19 is controlled to be equal to the newly decided DC source voltage Vdc, which now serves as the target voltage, and such output is supplied to the amplification unit 14. Thus, the DC source voltage Vdc is lowered so that the amplitude becomes maximal within the range where the voltage between the amplified-side terminals of the amplifying elements of the amplification unit 14 is not saturated, and therefore the power loss can be reduced to a maximum possible extent.

To be more detailed, the peak detection circuit 32 of the output voltage detection unit 21 detects the peak-to-peak value of the voltage Vdet acquired by the voltage acquisition circuit 31, and outputs the detected value to the target voltage decision unit 22.

The target voltage decision unit 22 decides the DC source voltage Vdc to be generated by the DC source unit 19, whereas the voltage Vdet acquired by the voltage acquisition circuit 31 is not equal to the voltage practically induced on the primary winding side of the second transformer T2. In other words, the ratio of the value of the voltage Vdet acquired by the voltage acquisition circuit 31 with respect to the voltage induced on the primary winding side of the second transformer T2 is proportional to the turns ratio between the primary winding and the auxiliary winding T2c. In the peak detection circuit 32, therefore, the turns ratio and the actually detected value are multiplied.

Also, since the peak-to-peak value is a value between a minimal value and a maximal value of the waveform of the voltage, the output has to be set at ½ of the peak-to-peak value, in order to obtain the DC source voltage Vdc that provides the maximal amplitude within the range where the waveform of the voltage is not saturated. Here, since the resistances R5, R6 are serially connected in the circuit shown in FIG. 4, an output corresponding to ½ of the peak-to-peak value is obtained. In the peak detection circuit 32, therefore, it is not necessary to multiply the actually detected value by ½.

More specifically, when the turns ratio between the primary winding and the auxiliary winding T2c of the second transformer T2 is 10:1, the decided value of the DC source voltage Vdc to be outputted to the switch unit 17 can be calculated by Vdet×10×½.

Assuming that the load L is currently suffering fluctuation in impedance, since the switch unit 17 has switched the decided value of the DC source voltage Vdc from the value decided by the DC voltage decision unit 16 to the value newly decided by the target voltage decision unit 22, and the switched decided value is output to the second control unit 18.

Then the DC source unit 19 generates the DC source voltage Vdc based on the value decided by the target voltage decision unit 22, and the generated voltage is supplied to the power amplifier 25 of the amplification unit 14.

Figure 8:
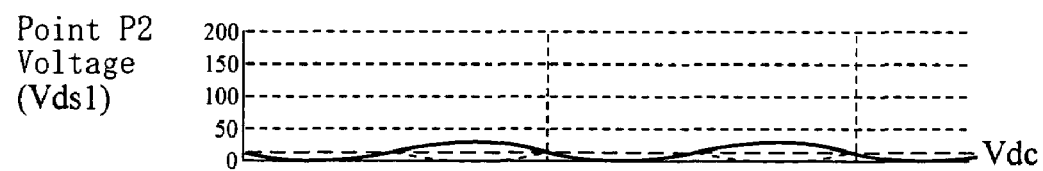
FIG. 8 is a waveform chart of a voltage on point P2 in the power amplifier, obtained under fluctuation of the load impedance.

The power amplifier 25 adopts the DC source voltage Vdc newly generated by the DC source unit 19 as the reference. The value of the DC source voltage Vdc is lowered, for example as shown in FIG. 8. Accordingly, the loss in the first amplifying element Q1 and the second amplifying element Q1 can be reduced, despite the fluctuation of the load impedance.

It should be noted that although the target voltage decision unit 22 multiplies the voltage Vdet acquired by the voltage acquisition circuit 31 by ½ thus to decide the value of the DC source voltage Vdc, the value of the DC source voltage Vdc may be decided such that a desired high frequency power is output even though the load impedance sharply fluctuates when the first and the second amplifying element Q1, Q2 are turned on. For example, the voltage Vdet acquired by the voltage acquisition circuit 31 may be multiplied by a value slightly greater than ½ (for example 0.65 (130% of the amplitude)), to secure a certain tolerance.

Figure 9:
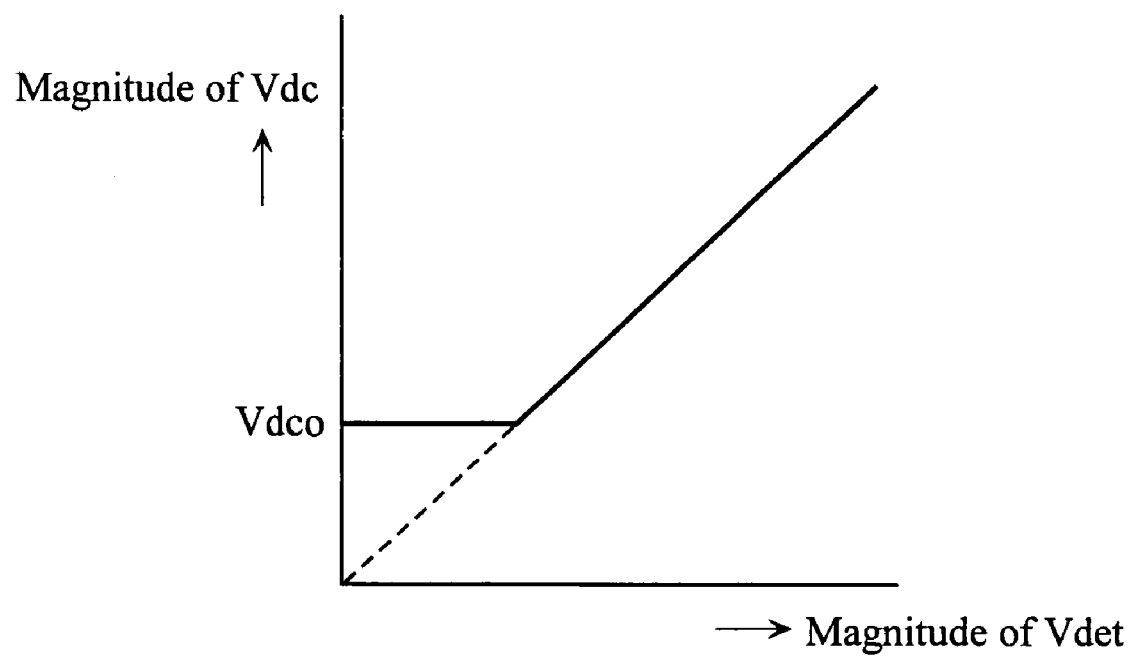
FIG. 9 is a graph showing the relationship between the lower limit of the DC source voltage and the output voltage.

In the target voltage decision unit 22, a lower limit of the DC source voltage Vdc may be provided in advance. More specifically, as shown in FIG. 9, the lower limit value Vdc0 of the DC source voltage Vdc may be set in advance, so that the DC source voltage Vdc is not decided at a value lower than the lower limit value Vdc0. Such arrangement inhibits adopting a value lower than the lower limit value Vdc0 as the DC source voltage Vdc, according to the fluctuation of the output voltage, thereby providing an advantage of improved responsiveness of the circuit. Here, the lower limit value Vdc0 of the DC source voltage Vdc is set at approximately 10% of the maximum output.

Figure 10:
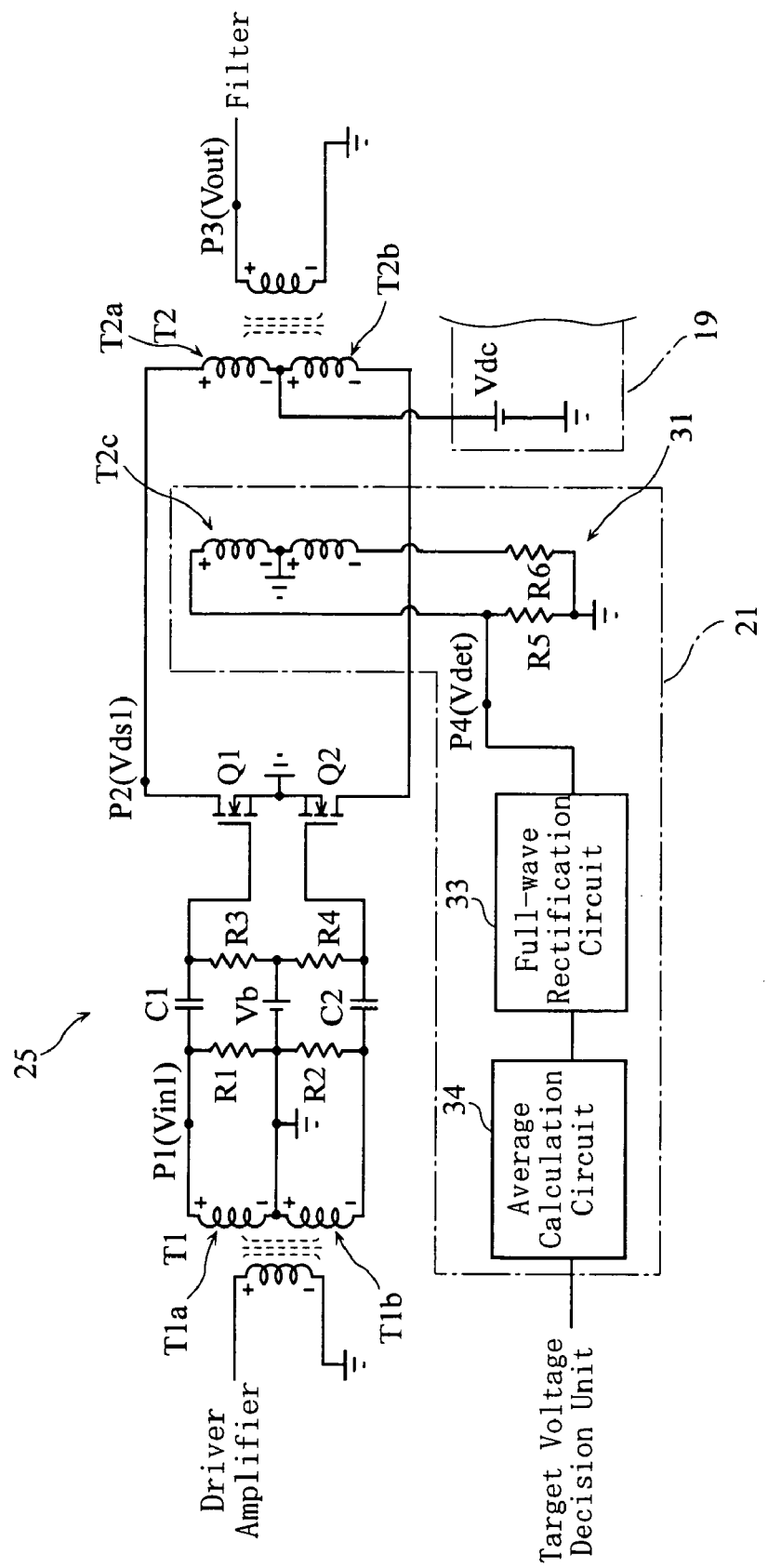
FIG. 10 is a circuit diagram of a power amplifier, an output voltage detection unit and a part of a DC source unit, in a high frequency power supply according to a second embodiment of the present invention.

FIG. 10 is a circuit diagram of the power amplifier 25 and the output voltage detection unit 21 according to a second embodiment of the present invention. While the output voltage detection circuit 21 is set to detect the peak value of the output voltage in the first embodiment, the output voltage detection circuit 21 according to the second embodiment serves to acquire an average value of the output voltages, unlike the arrangement in the first embodiment. Specifically, as shown in FIG. 10, the output voltage detection circuit 21 includes a full-wave rectification circuit 33 and an average calculation circuit 34. The structure of the remaining portion is generally similar to that of the first embodiment.

Figure 11:
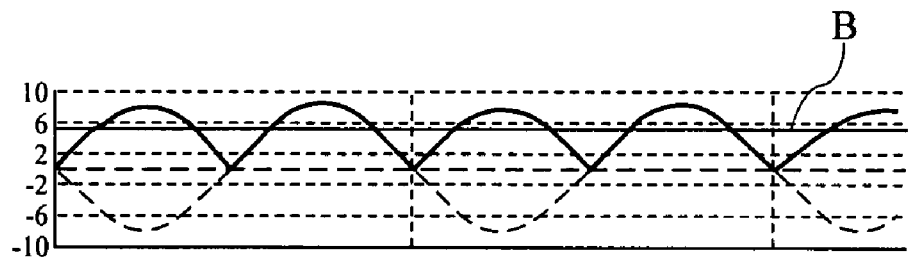
FIG. 11 is a waveform chart of a voltage on point P4 in the output voltage detection unit.

The full-wave rectification circuit 33 executes full-wave rectification of the output voltage Vdet acquired by the output voltage acquisition circuit 31, as the voltage waveform shown in FIG. 11, and the average calculation circuit 34 acquires an average value by calculation based on the full-wave-rectified output voltage Vdet, as indicated by a line B in FIG. 11.

The target voltage decision unit 22 multiplies the average value calculated by the average calculation circuit 34 by (n/2), and also by a value determined based on the turns ratio between the primary winding and the auxiliary winding T2c of the second transformer T2 (for example, 10) as described above. Thus, the target voltage decision unit 22 calculates as Vdet×(n/2)×10, and outputs the product to the switch unit 17 as the decided value of the DC source voltage Vdc. Here, the average value can be obtained by multiplying the amplitude value of the full-wave-rectified voltage waveform by (2/n), and hence multiplying the output voltage Vdet acquired by the output voltage acquisition circuit 31 by the inverse number of (2/n) leads to obtaining the amplitude value of the full-wave-rectified voltage waveform.

The switch unit 17 switches from the value decided by the DC voltage decision unit 16 to the value newly decided by the target voltage decision unit 22 because of the fluctuation of the load impedance, and the switched decided value is output to the second control unit 18. The DC source unit 19 generates the DC source voltage Vdc based on the value decided by the target voltage decision unit 22, and outputs the DC source voltage Vdc to the power amplifier 25 of the amplification unit 14. Accordingly, the loss in the power amplifier 25 is reduced because of adopting the DC source voltage Vdc newly generated by the DC source unit 19 as the reference.

It should be noted that in the target voltage decision unit 22 according to the second embodiment also, (n/2) may be substituted with a value slightly greater than that (for example 2 (130% of the amplitude)), to secure a certain tolerance for the output value of the high frequency power.

Figure 12:
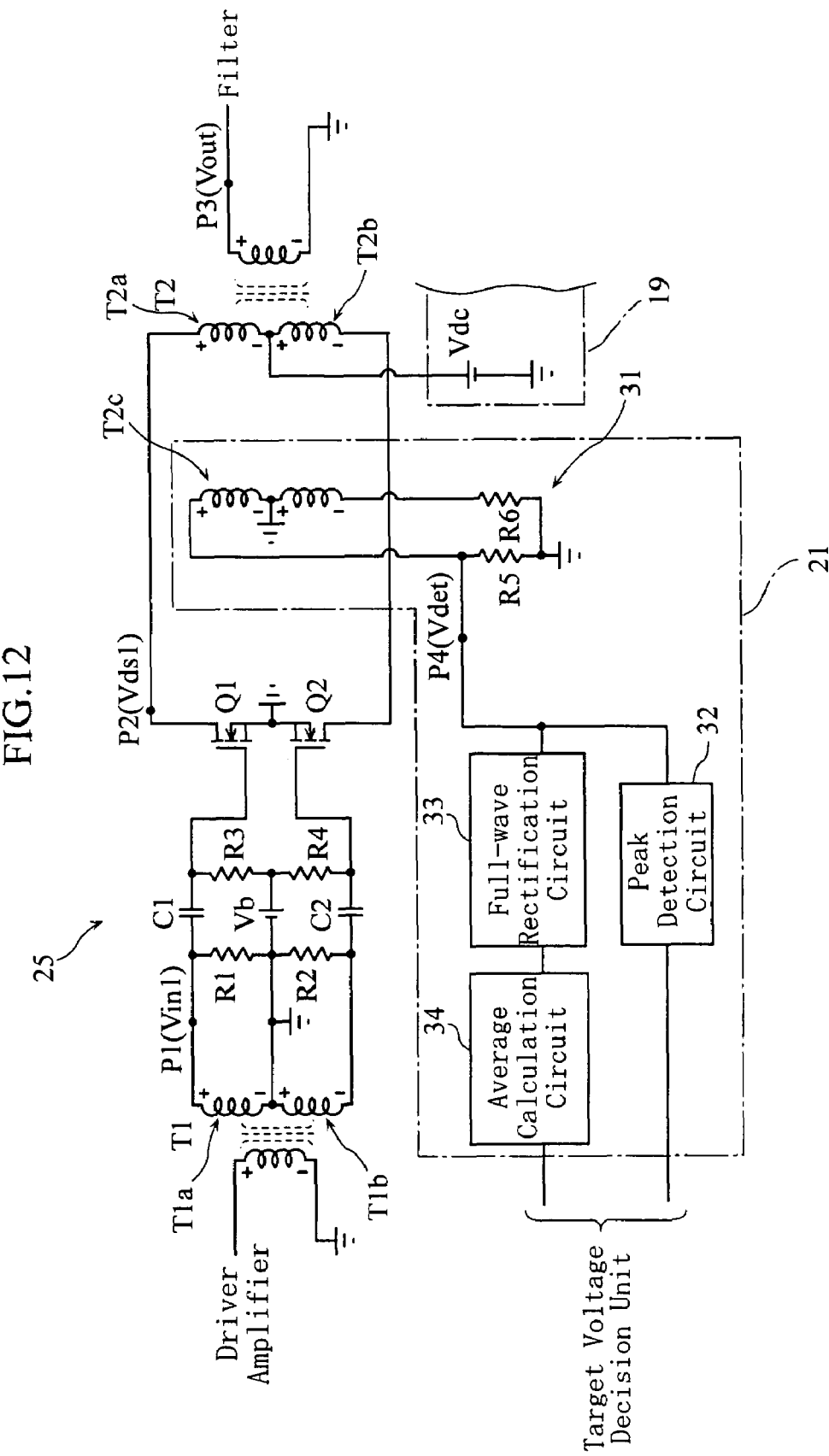
FIG. 12 is another circuit diagram of the output voltage detection unit.

Also, as shown in FIG. 12, the peak detection circuit 32 referred to in the first embodiment, and the full-wave rectification circuit 33 and the average calculation circuit 34 referred to in the second embodiment may be employed in combination.

Figure 13:
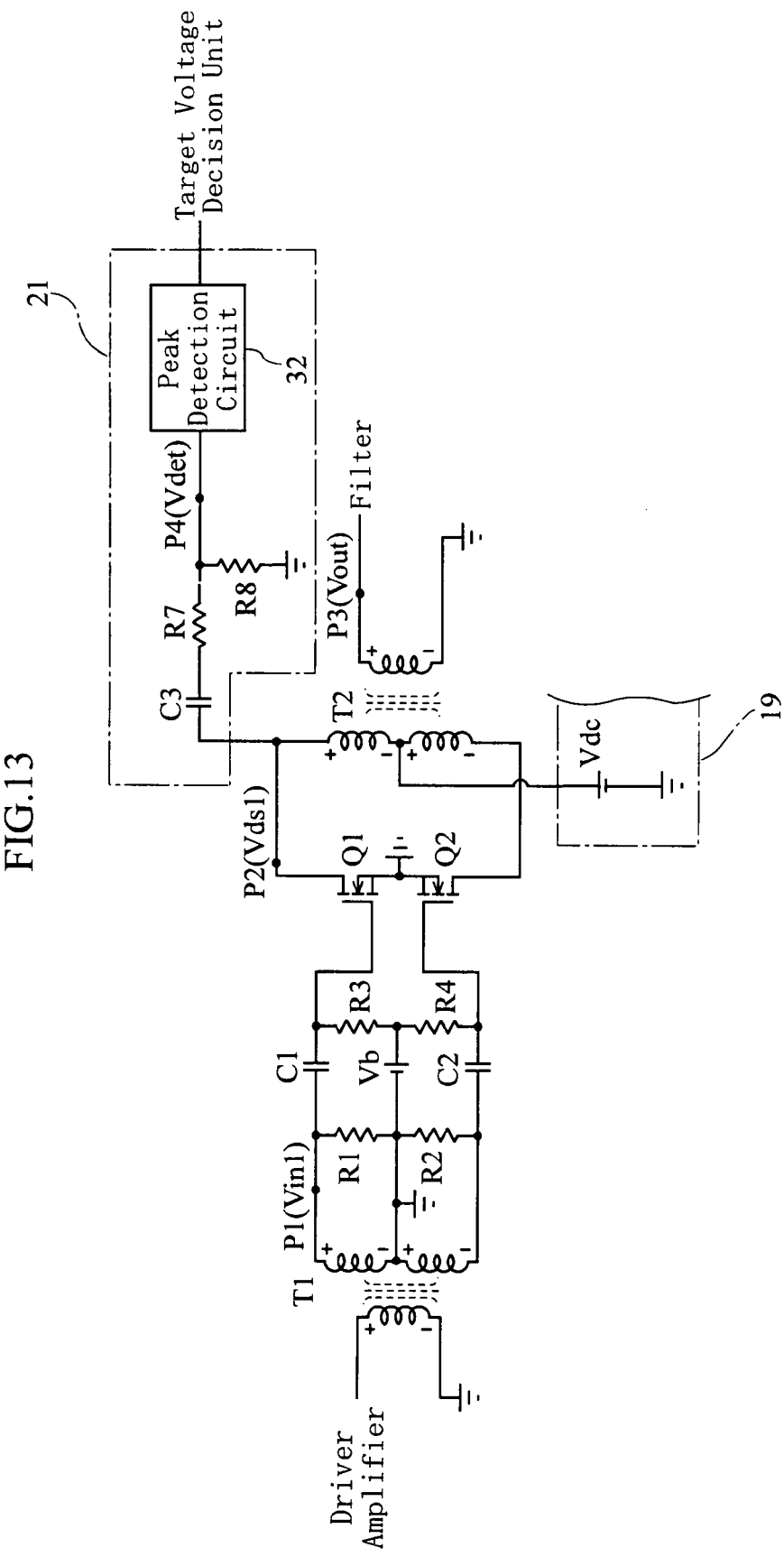
FIG. 13 is still another circuit diagram of the output voltage detection unit.

Naturally, the scope of the present invention is not limited to the foregoing embodiments. Although the output voltage detection unit 21 of the power amplifier 25 is set to acquire the high frequency voltage through the auxiliary winding T2c wound on the primary winding side of the second transformer T2 in the first and the second embodiment, the high frequency voltage may be acquired, for example directly from the drain terminal of the first amplifying element Q1, as shown in FIG. 13. The output voltage detection unit 21 shown in FIG. 13 includes the capacitor C3 that removes a DC component, a plurality of resistances R7, R8, and the peak detection circuit 32.

Figure 14:
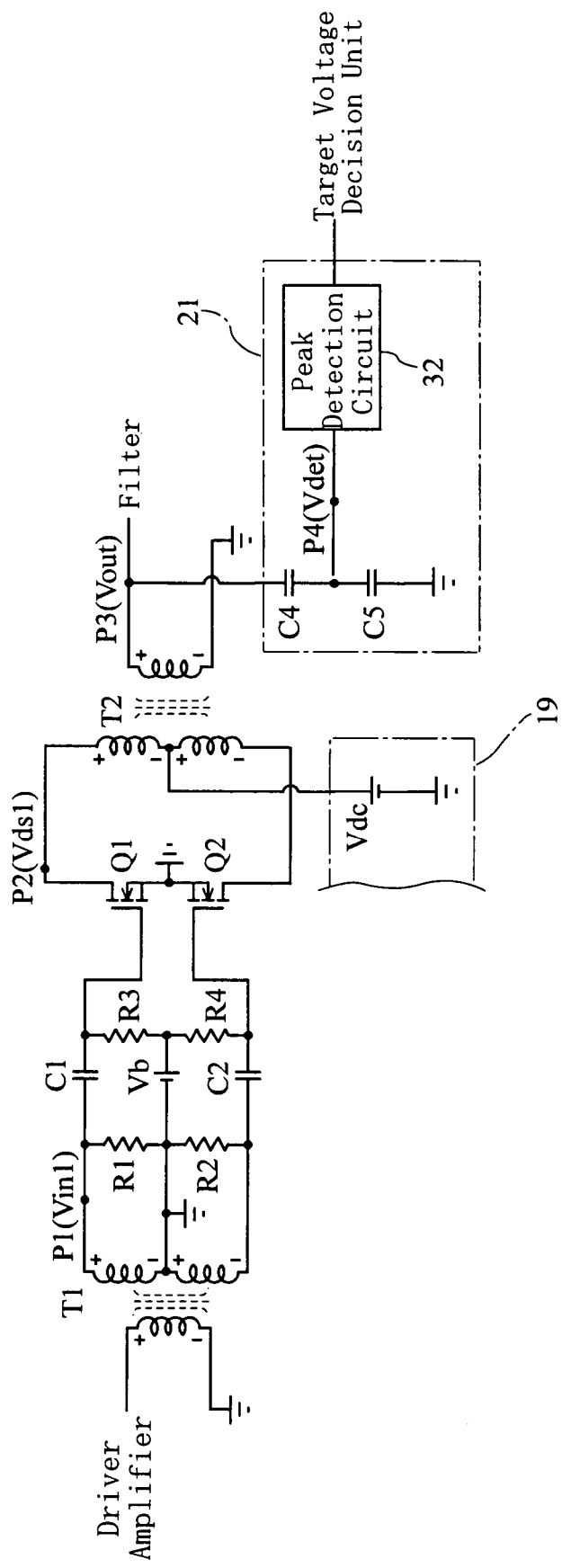
FIG. 14 is still another circuit diagram of the output voltage detection unit.

Also, the detection point of the output voltage is not limited to the output terminal of the first and the second amplifying element Q1, Q2. In short, when fluctuation of the load L has provoked fluctuation in amplitude of the voltage between the amplified-side terminals of one of the amplifying elements in the amplification unit 14, other detection points where the voltage similarly fluctuates according to the provoked fluctuation may be selected as desired. For example, as shown in FIG. 14, the high frequency voltage may be directly acquired from the secondary winding side of the second transformer T2. The output voltage detection unit 21 shown in FIG. 14 includes the capacitors C4, C5 that partially supplies the voltage, and the peak detection circuit 32.

Figure 15:
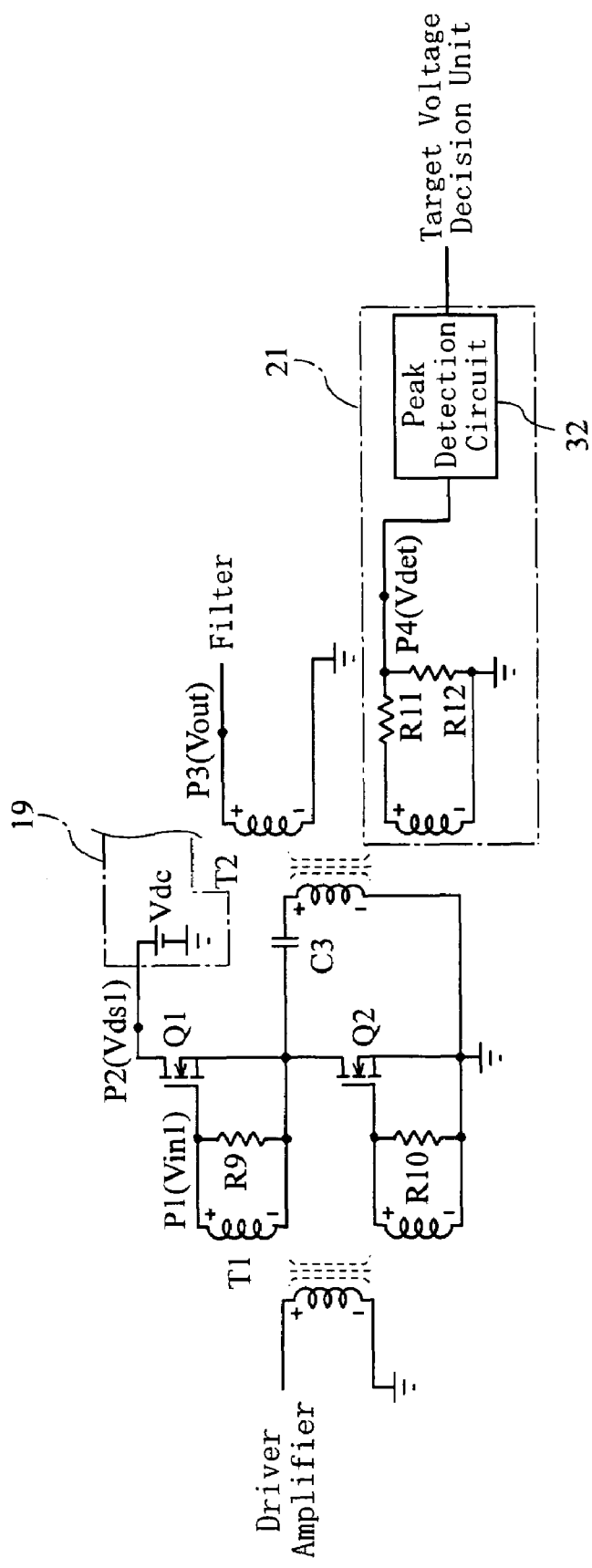
FIG. 15 is another circuit diagram of the power amplifier.

Also, although the push-pull circuit is employed for constituting the power amplifier 25 in the first and the second embodiment, for example a single-ended push-pull circuit may be employed as shown in FIG. 15.

Figure 16:
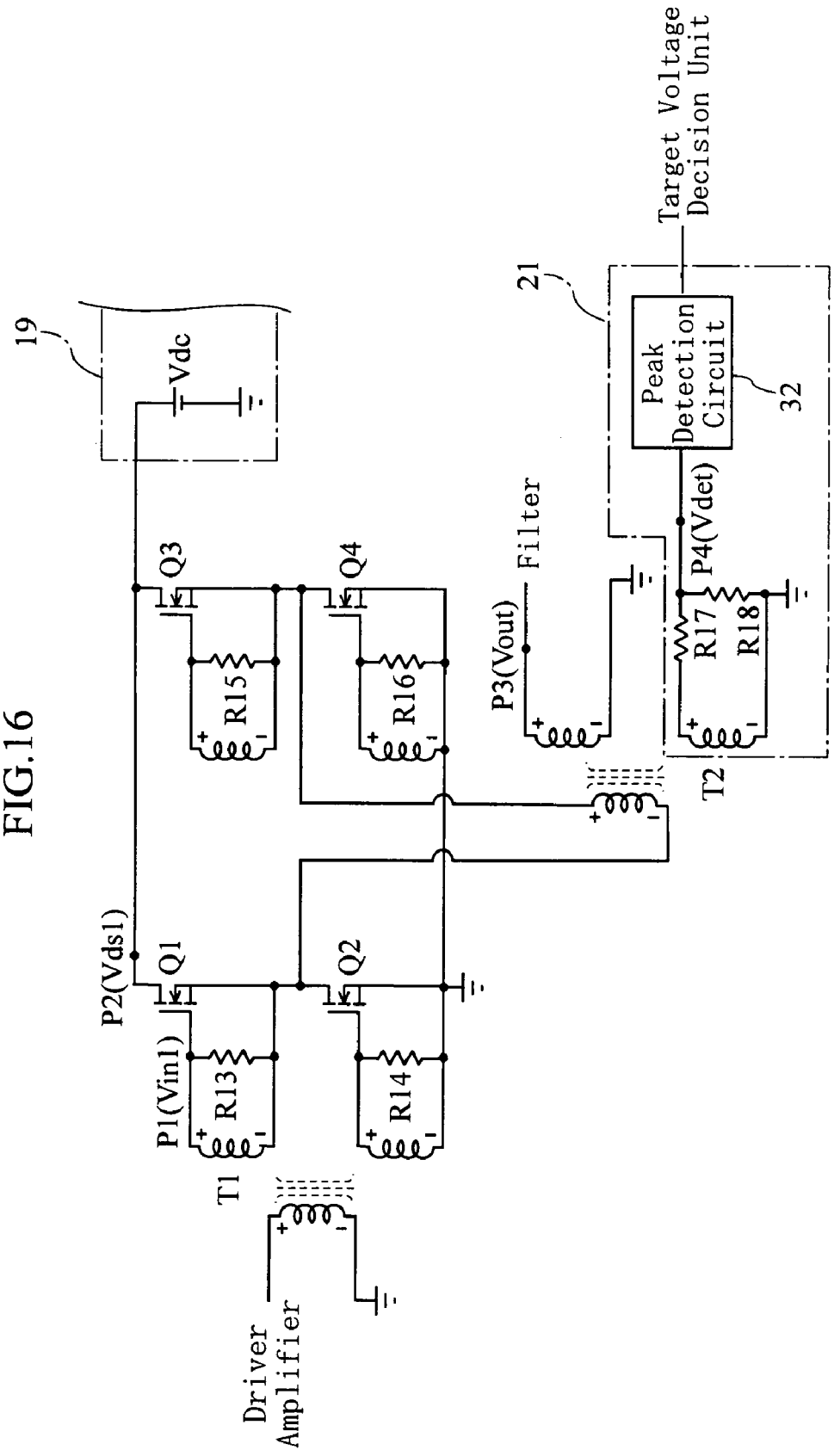
FIG. 16 is still another circuit diagram of the power amplifier.
Figure 17:
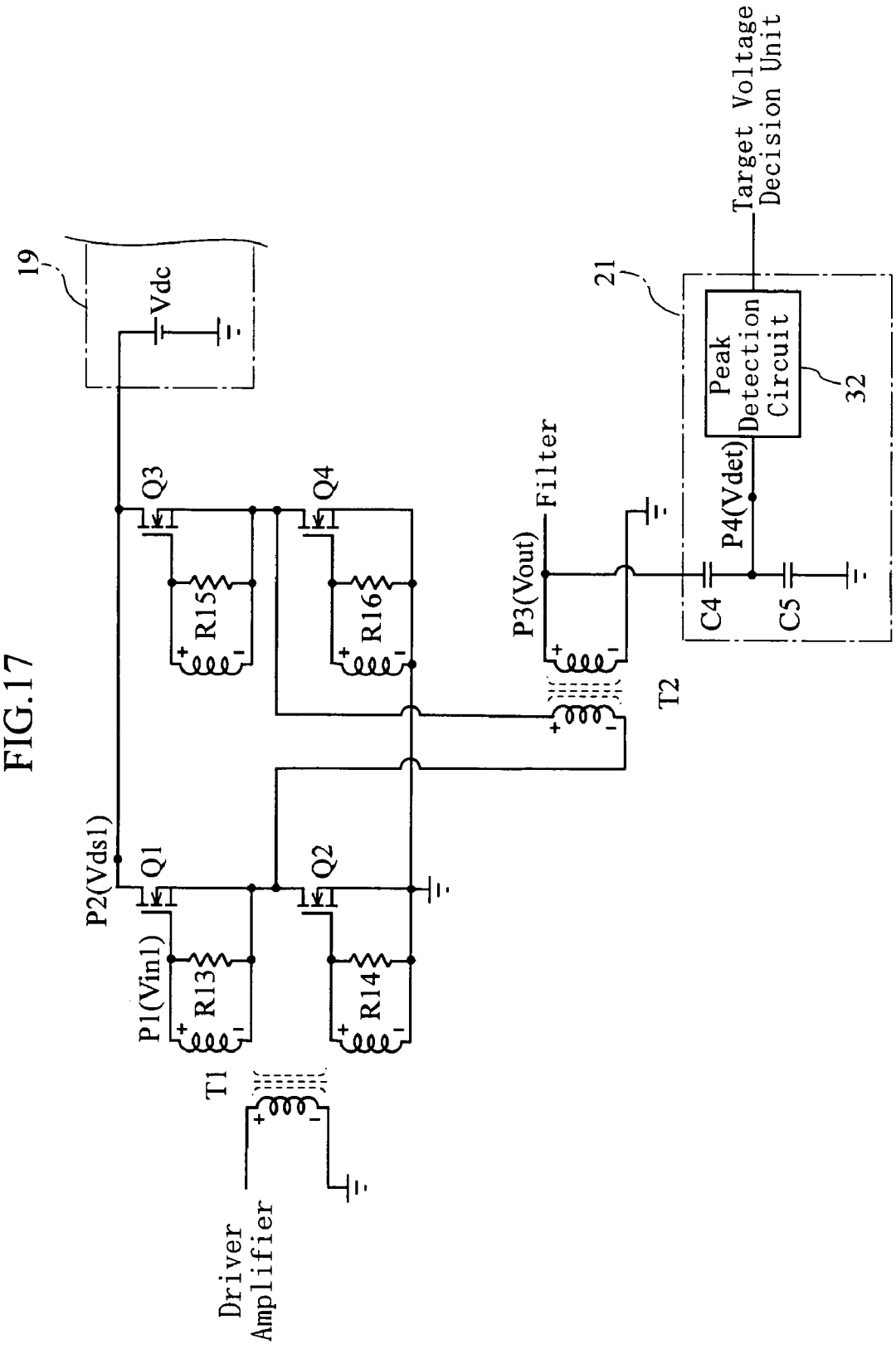
FIG. 17 is still another circuit diagram of the power amplifier.
Figure 18:
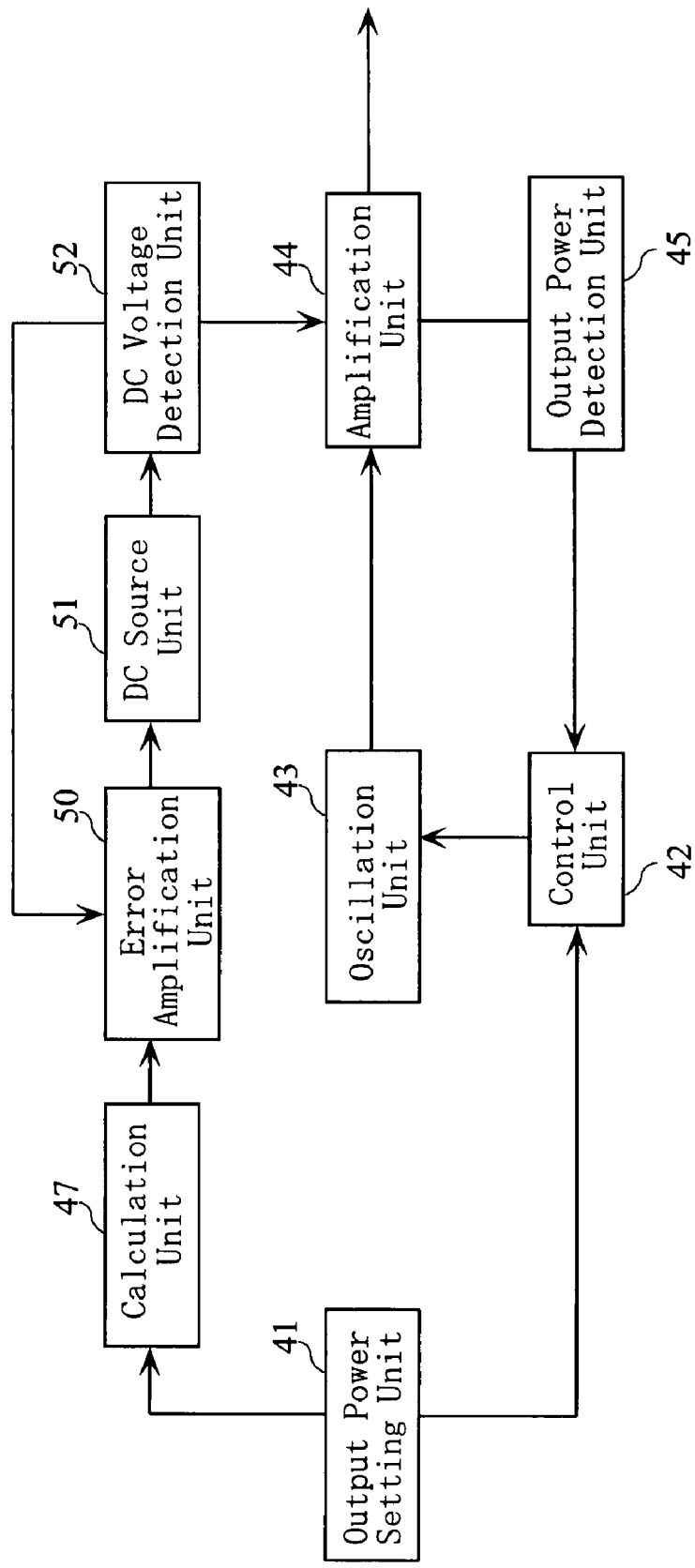
FIG. 18 is a block diagram showing the configuration of a conventional high frequency power supply.
Figure 19:
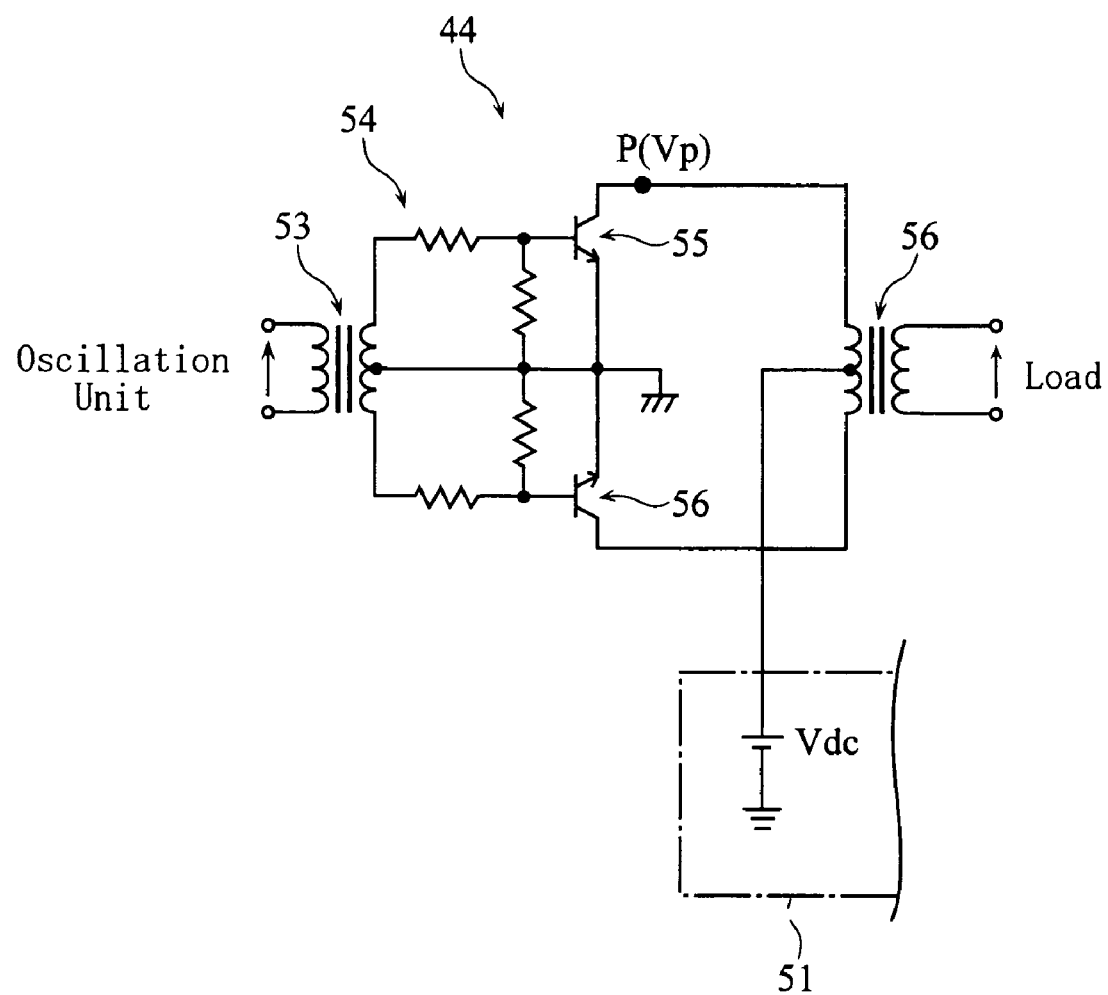
FIG. 19 is a circuit diagram of an amplification unit in the conventional high frequency power supply.

Further, the power amplifier 25 may be substituted with what is known as a full-bridge circuit, as shown in FIGS. 16 and 17.

Further, although the output voltage detection unit 21 is connected to the power amplifier 25 to detect the high frequency voltage from the power amplifier 25 in the first and the second embodiment, this is not the only possible configuration. For example, the high frequency voltage may be detected either from the combiner 28 or the filter 26 of the amplification unit 14 shown in FIG. 4. Otherwise, the output voltage of the high frequency power may be detected from the power detection unit 15.

The invention claimed is:

1. A high frequency power supply that supplies a high frequency voltage amplified by an amplification unit to a load, comprising:
    a DC voltage power source unit that generates and outputs a DC voltage, the DC voltage power source unit being capable of changing an output level of the DC voltage to be outputted;
    a DC voltage detection unit that detects the DC voltage outputted by the DC voltage power source unit;
    a DC voltage control unit that controls the output level of the DC voltage power source unit such that the DC voltage detected by the DC voltage detection unit becomes equal to a target voltage;
    an oscillation unit capable of changing an output level of a high frequency voltage signal to be outputted;
    an amplification unit including a plurality of amplifying elements, to amplify and output the high frequency voltage signal outputted by the oscillation unit utilizing the DC voltage outputted by the DC voltage power source unit as an energy source for the amplification;
    an output power setting unit that decides an output power value of the high frequency power to be supplied to the load;
    a power detection unit that is connected to the load and detects the output of the amplification unit in power value;
    a high frequency signal control unit that controls the output level of the oscillation unit such that die power value detected by the power detection unit becomes equal to the decided output power value;
    an amplitude detection unit that detects an amplitude of a voltage between amplified-side terminals of the amplifying elements of the amplification unit, or an amplitude of a voltage that is proportional to the amplitude of the voltage between the amplified-side terminals, the amplitude detection unit being provided separately from the power detection unit; and
    a target voltage decision unit that decides a target value of the DC voltage based on the amplitude of the voltage detected by the amplitude detection unit.

2. The high frequency power supply according to claim 1, wherein the amplitude of the voltage detected by the amplitude detection unit is the amplitude of the voltage between the amplified-side terminals of one of the amplifying elements of the amplification unit, or the amplitude of the voltage proportional to the amplitude of the voltage between the amplified-side terminals.

3. The high frequency power supply according to claim 1, wherein the amplitude of the voltage detected by the amplitude detection unit is the amplitude of the voltage between the amplified-side terminals of a plurality of amplifying elements of the amplification unit, or the amplitude of the voltage proportional to the amplitude of the respective voltages between the amplified-side terminals.

4. The high frequency power supply according to claim 3, wherein the target voltage decision unit decides the target value of the DC voltage based on the amplitude of a highest voltage among the amplitudes of the voltages detected by the amplitude detection unit.

5. The high frequency power supply according to claim 1, further comprising:
    a DC voltage decision unit that decides the DC voltage based on the output power value decided by the output power setting unit; and
    a switch unit that temporarily utilizes the output of the DC voltage decision unit as the target voltage under a specific state.

6. The high frequency power supply according to claim 5, wherein the specific state arises when the amplification unit has started the outputting, or when the output power setting unit has updated the decided output power value.

7. The high frequency power supply according to claim 6, wherein the specific state also arises when the power value detected by the power detection unit has reached a predetermined ratio with respect to the decided output power value.

8. The high frequency power supply according to claim 5, wherein the switch unit utilizes the output of the DC voltage decision unit as the target voltage until a predetermined time elapses after the specific state comes up.

9. The high frequency power supply according to claim 1, wherein the target voltage decision unit decides the DC voltage target value with a lower limit.

10. The high frequency power supply according to claim 1, wherein the amplitude of the voltage detected by the amplitude detection unit is a peak-to-peak value of the voltage.

11. The high frequency power supply according to claim 1, wherein the amplitude of the voltage detected by the amplitude detection unit is an average of the voltages.

12. The high frequency power supply according to claim 1, wherein the amplitude of the voltage detected by the amplitude detection unit is a root mean square value of the voltage.

13. The high frequency power supply according to claim 1, wherein each amplifying element of the amplification unit is constituted of a field effect transistor; and wherein the amplitude of the voltage between the amplified-side terminals is the voltage between a drain and a source of the field effect transistor.

14. The high frequency power supply according to claim 1, wherein each amplifying element of the amplification unit is constituted of a bipolar transistor; and
    wherein the amplitude of the voltage between the amplified-side terminals is the voltage between a collector and an emitter of the bipolar transistor.

* * * * *